United States Patent
Schulz et al.

(10) Patent No.: US 6,936,185 B1
(45) Date of Patent: Aug. 30, 2005

(54) METAL HYDRIDE BANDS AND USE THEREOF FOR STORING HYDROGEN

(75) Inventors: Robert Schulz, Sainte-Julie (CA); Sabin Boily, Chambly (CA); Rene Dubuc, Sainte-Julie (CA); Marco Blouin, Montreal (CA); Guy Lalande, Montreal (CA)

(73) Assignee: Hydro-Quebec, Montreal (CA)

( * ) Notice: Subject to any disclaimer, the term of this patent is extended or adjusted under 35 U.S.C. 154(b) by 221 days.

(21) Appl. No.: 10/069,035

(22) PCT Filed: Jul. 21, 2000

(86) PCT No.: PCT/CA00/00865

§ 371 (c)(1),
(2), (4) Date: May 22, 2002

(87) PCT Pub. No.: WO01/13445

PCT Pub. Date: Feb. 22, 2001

(30) Foreign Application Priority Data

Aug. 18, 1999 (CA) .............................. 2280434

(51) Int. Cl.⁷ ............................. H01M 4/24; H01M 8/06
(52) U.S. Cl. ................................ 252/188.26; 429/218.2
(58) Field of Search ...................... 206/0.7; 252/188.25, 252/188.26; 423/648.1, 658.2; 429/218.2

(56) References Cited

U.S. PATENT DOCUMENTS

| | | | |
|---|---|---|---|
| 3,911,896 A | 10/1975 | Charboneau et al. | 126/350 |
| 4,134,491 A | 1/1979 | Turillon et al. | 206/0.7 |
| 4,174,702 A | 11/1979 | Rappaport | 126/208 |
| 4,187,092 A | 2/1980 | Woolley | 62/48 |
| 4,402,933 A | 9/1983 | De Pous | 423/648 R |
| 4,548,044 A | 10/1985 | Sakai et al. | 62/48 |
| 4,583,638 A | 4/1986 | Bernamer et al. | 206/0.7 |
| 4,599,867 A | 7/1986 | Retallick | 62/48 |
| 4,667,815 A | 5/1987 | Halene | 206/0.7 |
| 4,964,524 A | 10/1990 | Halene | 220/3 |
| 5,046,247 A | 9/1991 | Oguro et al. | 29/890.032 |
| 5,552,246 A * | 9/1996 | Hong | 429/218.2 |

FOREIGN PATENT DOCUMENTS

| | | | |
|---|---|---|---|
| EP | 0 245 932 | 11/1987 | H01M/4/28 |
| EP | 0 460 424 | 12/1991 | H01M/10/34 |
| GB | 2067983 | 8/1981 | C01B/3/00 |
| JP | 55082899 | 6/1980 | F17C/11/00 |
| WO | 96/23906 | 8/1996 | C22C/1/00 |
| WO | 98/21767 | 5/1998 | H01M/4/00 |

OTHER PUBLICATIONS

Cumming et al, *The storage of hydrogen as metal hydrides*, Ind. Eng. Chem., Process Des. Develop., vol. 13 No. 2 (1974).

J. Banhart, "Metallic Foams," *Europhysics News* 30: pp. 17–20 (Jan. 1999).

Ron Moshe, "Metal Hydrides of Improved Heat Transfer Characteristics," *Proceedings of the 11th Intersociety Energy Conversion Engineering Conference (IECEC* (State Line, NV): pp. 954–960 (1976).

* cited by examiner

*Primary Examiner*—Stanley S. Silverman
*Assistant Examiner*—Maribel Medina
(74) *Attorney, Agent, or Firm*—Darby & Darby

(57) ABSTRACT

The invention concerns a piece based on one or several metal hydrides capable of reversibly absorbing hydrogen. Said piece is in the form of a thin and dense band, having a thickness preferably not more than 1 mm and porosity preferably less than 20%. The piece is obtained by rolling a powder of selected hydride(s), with or without additional component(s), such as binders or heat-transfer elements. Said piece can easily be produced on an industrial scale. By its very nature, it is particularly adapted for use as a base element in a tank for storing and transporting hydrogen. It can also be used in a Ni-MH typre battery for storing and transporting energy.

19 Claims, 7 Drawing Sheets

METAL HYDRIDE BANDS AND USE THEREOF FOR STORING HYDROGEN

BACKGROUND OF THE INVENTION

The present invention relates to pieces made of at least one metal hydride, which are in the form of strips obtained by rolling.

The invention also relates to the use of these pieces for the storage and transportation of hydrogen in hydrogen storage tanks.

The invention further relates to the use of the same pieces in batteries of the Ni-MH type and in equipment used for purification, separation, compression, detection, cooling, heating, storing and generation of energy.

In the present description and the appended claims, the expression "metal hydrides" is used to designate all metals, alloys, composites and other materials known to absorb hydrogen in a reversible manner, whether these products are in a non-hydrogenated form (that is before absorption or after desorption of hydrogen) or in a hydrogenated form (that is after absorption and before desorption of hydrogen). These hydrides can be of the type known to be "high temperature". By way of examples of such hydrides, mention can be made to Na, Mg, $Mg_2Ni$, Li, Ti, Zr and Ca. These hydrides may also be of the type "low or relatively low temperature". By way of examples of such hydrides, mention can be made to $MmNi_5$, $LaNi_5$, $CaNi_5$, FeTi, $Ti_{0.98}Zr_{0.02}V_{0.43}Fe_{0.09}Cr_{0.051}Mn_{1.5}$ and the Bogdanovic alloys.

BRIEF DESCRIPTION OF THE PRIOR ART

The use of metal hydrides for storing and transporting hydrogen is well known per se. The hydrogen which is so stored is usually used as a source of energy for hydrogen powered vehicles, batteries or machines or other kind of equipments used for purification, separation, compression, detection, cooling and heating.

If all these potential applications are extremely interesting, there is still a practical problem of heat and mass (hydrogen), transfer which is associated to the use of metal hydrides having high hydrogen absorption and desorption kinetics. Indeed, absorption of hydrogen by a metal hydride is an exothermic phenomenon. Therefore, it is necessary to quickly evacuate the heat during the absorption, since otherwise the process will be slowed down. On the other hand, desorption is an endothermal phenomenon. It is therefore necessary to provide heat in a quick manner in order to extract hydrogen at a high rate from a metal hydride. When one wants to hydrogenate or dehydrogenate very quickly a material and thus, at the same time, to extract or supply heat, the thermal and diffusion paths must be reduced as much as possible, thereby making it necessary for the material to have at least one dimension which is small. Moreover, in order to obtain a high storage capacity per volume unit, it is necessary to consolidate and densify the hydride when the latter is in the form of a powder.

In order to tentatively overcome this problem, Japanese patent application No. JP-A-60/262.830 published on Dec. 26, 1985 in the name of TOYOTA CENTER OF RESEARCH & DEVELOPMENT LAB suggests to give the shape of a thin sheet to the hydride. This sheet is obtained by "molding" the hydride around a metal mesh by means of a synthetic resin, such as a silicon resin. Such a "molding" process is quite difficult to carry out from an industrial standpoint. Moreover, as everybody knows, synthetic resins (polymers) cannot be exposed to high temperatures. Accordingly, the hydrides that can be used can only be low temperature metal hydrides (example 1 of this laid-open application refers to $LaNi_5$). It is impossible to use this technology with high temperature metal hydrides. Moreover, since synthetic resins do not conduct electricity and heat, it is necessary to incorporate heat pipes into the molded sheet in order to circulate a heating/coding fluid for heat exchange.

OBJECTS AND SUMMARY OF THE INVENTION

A first object of the present invention is to give to a metal hydride a form suitable to efficiently solve the practical problem of heat and mass transfers mentioned hereinabove.

A second object of the invention is to achieve the requested forming of a metal hydride by using a technology that can easily be carried out in mass production and at low cost.

A third object of the invention is to generalize the use of metal hydrides that are so formed to all possible industrial applications for this type of product known to be capable of absorbing hydrogen in reversible manner.

In accordance with the invention, these various objects are achieved with at least one piece made of at least one metal hydride capable of absorbing hydrogen in a reversible manner, said piece being in the form of a thin and dense strip obtained by rolling of a powder of said at least one metal hydride and being characterized in that said strip is obtained at a temperature lower than 400° C.

This piece preferably has a thickness equal to or lower than 1 mm and made from a powder metal hydride(s) of nanocrystalline structure (cristallites of a size lower than 100 nm). This piece can have any shape: straight, stacked, folded, spiral, curved, twisted or cut.

In accordance with a particularly preferred embodiment of the invention, this piece may contain a first additional component for supplying and/or evacuating heat. This first additional component may also act as a binder for the powder of metal hydride(s).

The piece may also contain a second additional component acting as a binder for the powder of metal hydride(s).

The first end/or second additional components are preferably in the form of a powder additive. This additive may be a powder of Mg, Cu or Al.

Alternatively, the first and/or second additional components may be in the form of a tridimensional matrix preferably made of metal and having porous structure, that is rolled together with the powder of metal hydride(s).

The first and/or second additional components may also be in the form of a plate or tube in direct contact with the powder of metal hydrides).

Preferably, the weight of the first and/or second additional components corresponds to a maximum of up to 50% of the weight of the whole piece. More preferably, this weight does not exceed 30% only of the weight of the whole piece.

Intrinsically, the piece according to the invention is capable of absorbing hydrogen in a reversible manner. It can be formed to have intrinsic electric characteristics allowing measurement of its hydrogen content. It can also be formed to have intrinsic electric characteristics allowing desorption of hydrogen by circulation of an electric current.

As indicated hereinabove, the piece made of metal hydride(s) according to the invention is manufactured by rolling. This process is particularly advantageous in that it allows the manufacture of very dense strips of a very small thickness which as a result, have the above-mentioned characteristics. This process also has the advantage of being perfectly adapted for industrial production on a large scale and at low cost.

Because of its property, the piece according to the invention is particularly well adapted for use as basic components in a tank for the storage and transportation of hydrogen. It can also be used in a battery of the type Ni-MH for the storage and transportation of energy. It can further be used in other equipment selected amongst the purification, separation, compression, detection, cooling, heating, storing and generation of energy.

The invention and its advantages will be better understood upon reading the following more detailed but non-restrictive description made in reference to the accompanying drawings.

DETAILED DESCRIPTION OF THE INVENTION

As previously indicated, the invention essentially relates to a piece made of one or more metal hydrides that are capable of absorbing hydrogen in a reversible manner. The piece is in the form of a thin and dense strip having a thickness preferably equal to or lower than 1 mm and a porosity preferably lower than 20% which is obtained by rolling a powder of the selected hydride(s) with or without additional component(s). This strip has a typical width which is preferably lower than 15 cm and a length that can be of several meters.

By way of non-restrictive examples of hydrides that can be used for the manufacture of the pieces, mention can be made to those of nanocrystalline structures disclosed in U.S. Pat. Nos. 5,763,363; 5,837,030; 5,872,074 and 5,906,792 either in the name of the Applicant alone or in the name of the Applicant and the McGill UNIVERSITY. Even more particularly mention can be made to Mg.-based hydrides.

The key feature of the invention lies in the use of the well known method of "rolling" for giving to the powder of hydrides the form of thin and dense strips and thus for allowing optimization of the transfers of mass (hydrogen) and heat involved during the process of absorption/desorption of hydrogen.

In order to obtain by rolling having a high structural integrity, additional components such as binders can be added as additives to the hydrides. By way of examples of such additives, reference can be made to Mg, Al, V, Cu, Li, Fe, Nb, C, graphite, Co, Ni, Mn, Cr, Ti, Zr, and FeTi. These additives are preferably in the form of a powder that can be mixed with the powder of hydrides(s) and rolled together with it.

As an additional component, it may also be suggested to use a tridimensional structure preferably porous and made of metal, such as a metal foam, to insert the metal hydride powder into the pores of the structure and to roll the whole to obtain a thin strip. The metal structure that is so incorporated to the piece then permits to more quickly remove heat from the strip during hydrogen absorption.

Figure 1:
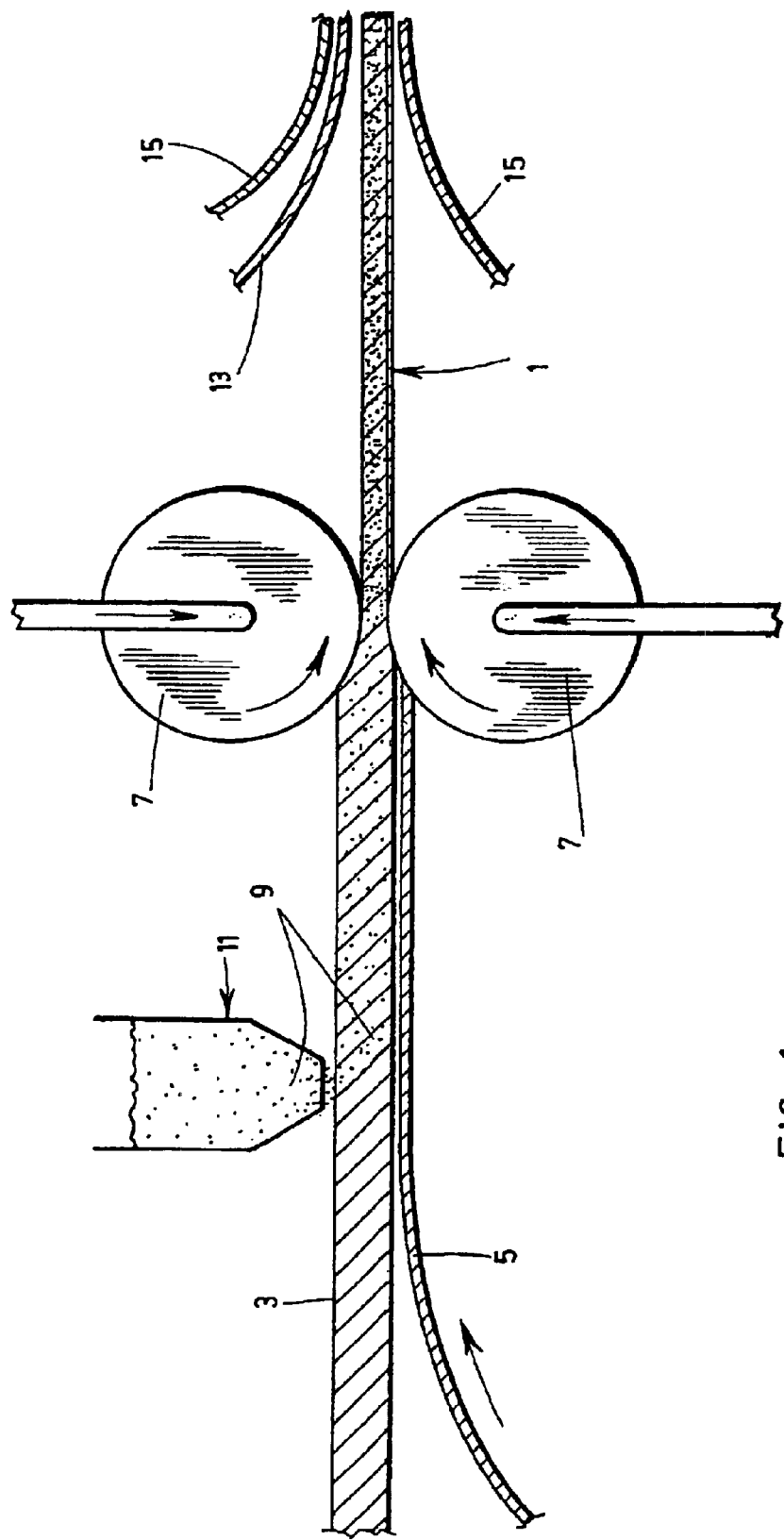
FIG. 1 is a schematic representation of the manufacture of a piece of metal hydride according to the invention, incorporating a tridimensional porous metal structure.

FIG. 1 is illustrative of this process of manufacture. As is shown, the tridimensional metal structure 3 is introduced with a carrier plate 5 preferably made of a heat conductive material, between the rollers 7 of a rolling machine. Just before such an introduction, the powder of metal hydride 9 stored into a tank 11 is poured into the structure 3 to fill up its pores. After rolling, the so obtained piece in the form of a thin and dense strip 1 can then be combined with other elements such as an electrical contact grid 13 and mattresses 15 of micro glass-fibers in order to obtain an operating unit ready to be incorporated into a tank for the storage of hydrogen.

In use, the rolling step can be carried out at ambient temperature or at elevated temperature (lower than 400° C.). The rolls 7 can be heated and their relative position can be adjusted to obtain a requested thickness and density.

As can be understood, the above-mentioned additives are used and rolled with the powder of metal hydride essentially in order to give structural integrity to the strip and to act as a heat conductor. Accordingly, it is important to preferably use additives in the form of metal powders or metal fibers, which are capable of acting not only as binders but also as heat conductors.

Together with these additives or as substituents for them, use can also be made of the tridimensional metal structure, or of the carrier plate or grid as already referred to hereinabove, or also of a metal tube into which the hydride powder is inserted before the rolling step. These components should also be made of a heat conductive material and be preferably provided with holes to let flow the hydrogen to be absorbed or desorbed.

In order to promote the desorption of hydrogen, use can be made of the intrinsic electric characteristics of the pieces in the form of strips obtained by rolling. Thus, for example, it is known that magnesium hydride $MgH_2$ is an insulating material. When the content of metal additives in a form of a powder or in a form of porous structure exceeds the percolation point, a strip made from this hydride becomes conductive. Moreover, during the desorption, $MgH_2$ switches from an insulating state to a conductive state. Thus, use can be made of these characteristics to induce desorption of hydrogen from the strip by passing an electric current therein. The change of resistivity of the pieces as a function of the content of hydrogen contained in them may also be used as an indicator of the amount of hydrogen within the tank.

Figure 4:
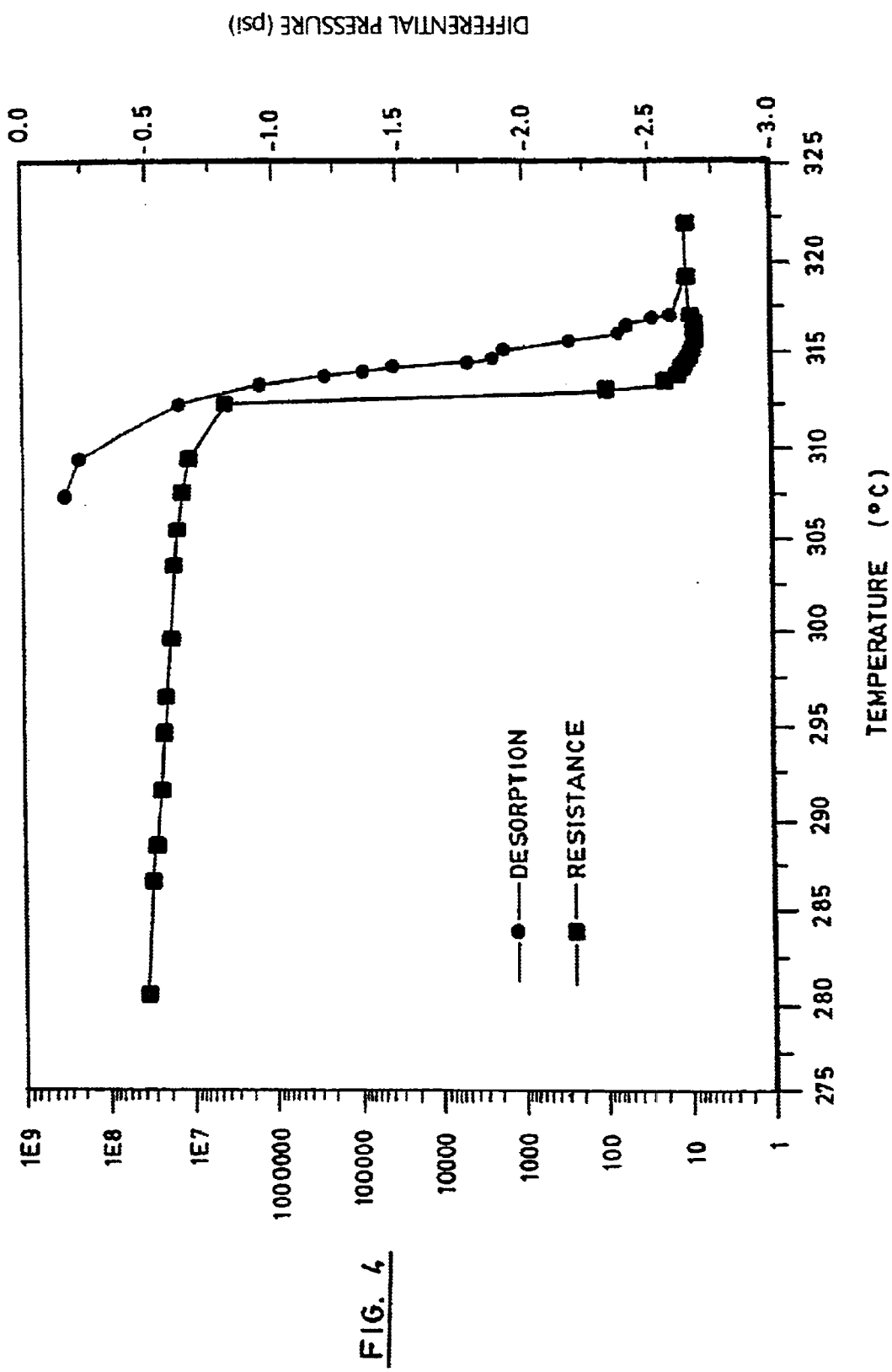
FIG. 4 is a curve illustrating the variation of resistivity of a consolidated piece of a metal hydride of the formula $MgH_2$-5 at. % V during hydrogen desorption and the variation of differential pressure of the hydrogen titration apparatus, as a function of the temperature.

FIG. 4 illustrates as an example, the change of resistivity of a consolidated piece made of $MgH_2$ and the change of differential pressure of the hydrogen titration apparatus used for measuring the amount of hydrogen within this piece as a function of the temperature during a desorption step. This figure shows that, during desorption, magnesium hydride ($MgH_2$) which is an insulating material, becomes conductive (Mg). This figure can be associated to the table given below which indicates the value of the electric resistance of 1 mm thick rolled pieces made from the same nanocrystalline metal hydride of formula $MgH_2$-5 at % V, to which were added variable amounts of a binder consisting of Mg of granulometry ranging from 105 μm to 850 μm (the Internal resistance of the measurement apparatus was 2000Ω).

| Amount of binder (Mg) added (expressed in weight) | 0% | 10% | 15% | 20% | 30% |
| --- | --- | --- | --- | --- | --- |
| Measured resistance (Ω) | $4 \times 10^{10}$ | $1 \times 10^{10}$ | 3000 | <2000 | <2000 |

It will be noticed that when the additional component acting as a binder is in the form of a powder that is mixed with and integrated to the hydride powder, it is of the highest importance that this component be well distributed and occupy all the volume of the piece, as is the case of a tri-dimensional metal structure when it is inserted into the hydride powder during rolling (see FIG. 1). As a matter of fact, one and/or the other of these two solutions are very preferable to a mere pressing of the hydride powder onto a substrate without any additives.

The concept of using pieces in the form of rolled strips of metal hydrides prepared as disclosed hereinabove, is sufficiently flexible to be adapted to a multitude of applications. These strips may be of any shape. They may be flat and rectilinear strips, cut into straight sections (see FIGS. 5 and 6. Alternatively, the strips may be folded and stacked upon themselves (FIG. 7a), rolled in a spiral (FIG. 7b), curved (FIG. 7C) or cut, sectioned and reassembled at an angle (FIG. 7d).

Figure 2:
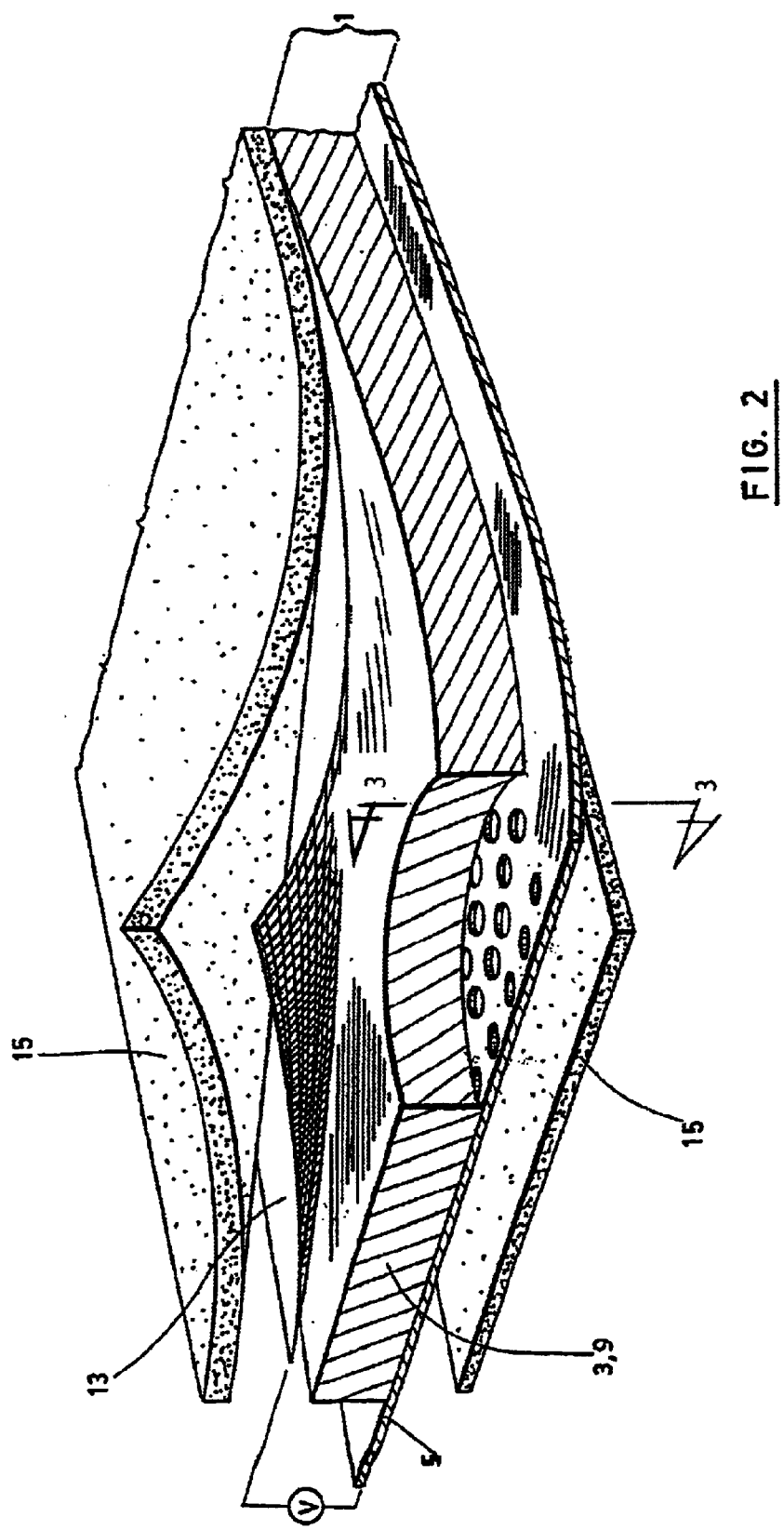
FIG. 2 is a representation of a piece of metal hydride according to the invention, associated with, on the one hand, a metal plate used as a heat carrier (and possibly as a contact electrode) and, on the other hand, mattresses of porous fibers for the supply and removal of hydrogen and for volume compensation.
Figure 3:
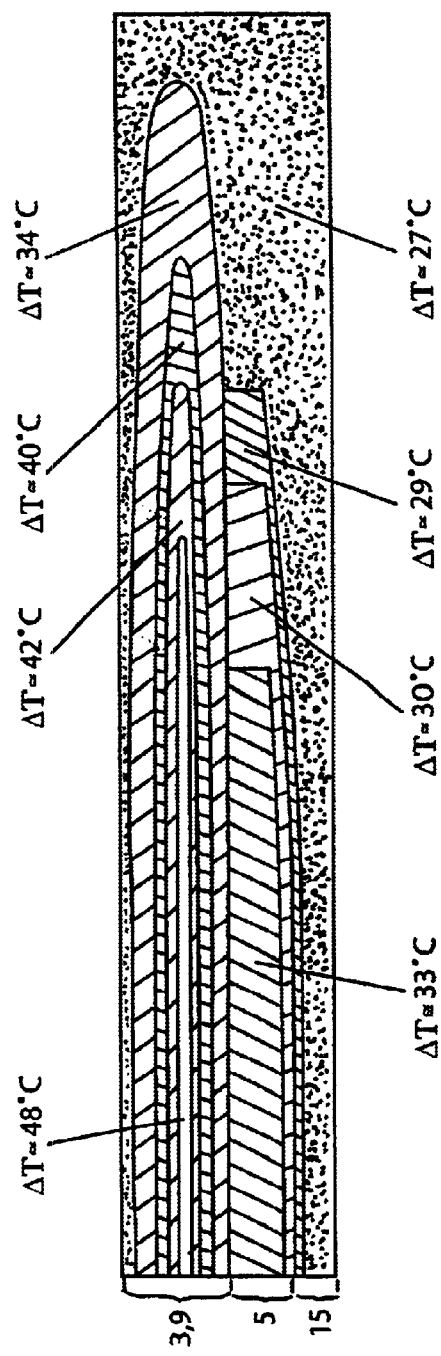
FIG. 3 is a cross-sectional view of an ensemble consisting of a piece according to the invention associated with, on the one hand, a metal plate acting as a heat carrier and, on the other hand, an insulating mattress, said figure giving numerical simulation of the heat transfer in this ensemble during hydrogen absorption.
Figure 5:
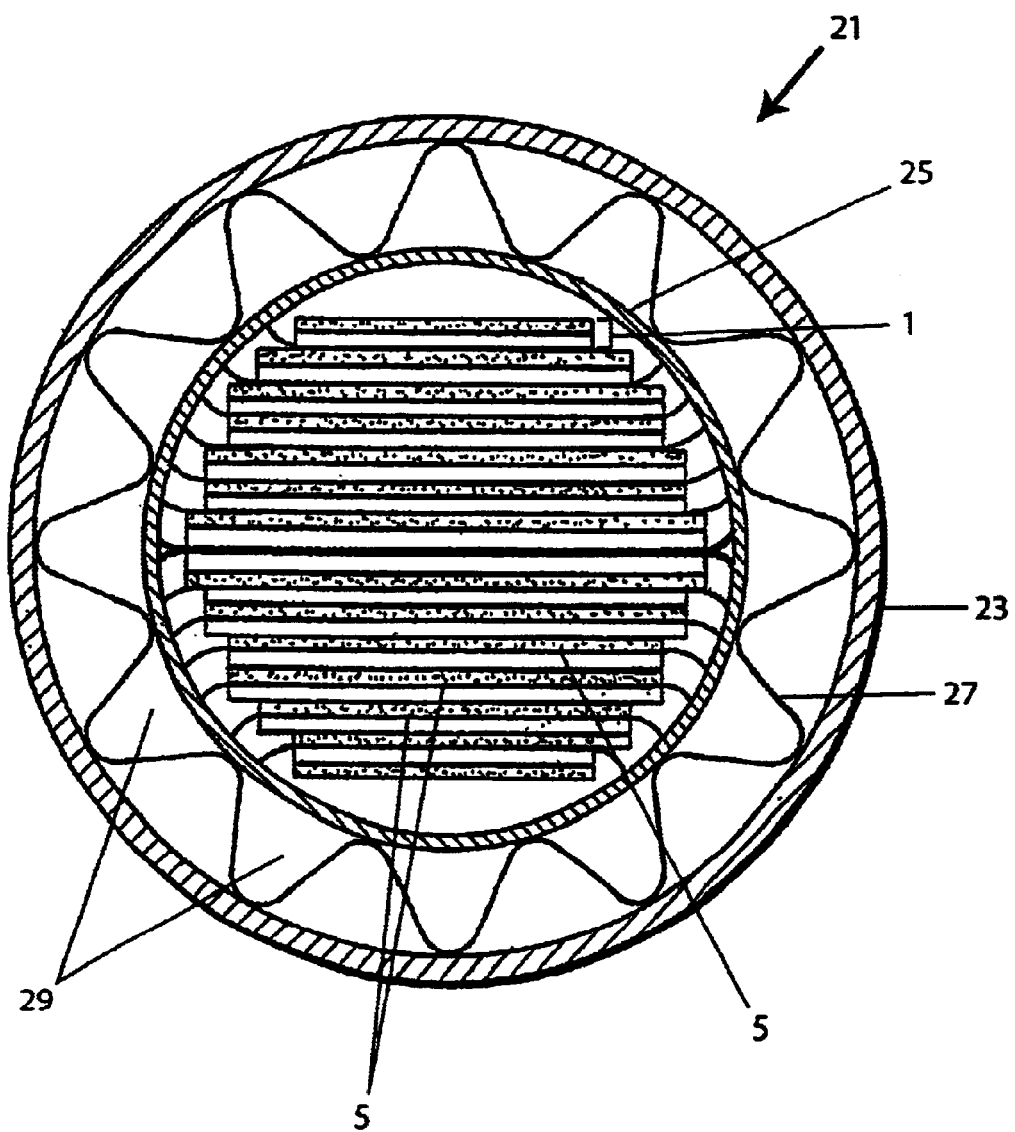
FIG. 5 is a schematic cross-section view of a tank for storing hydrogen, comprising a stack of pieces according to the invention.
Figure 6:
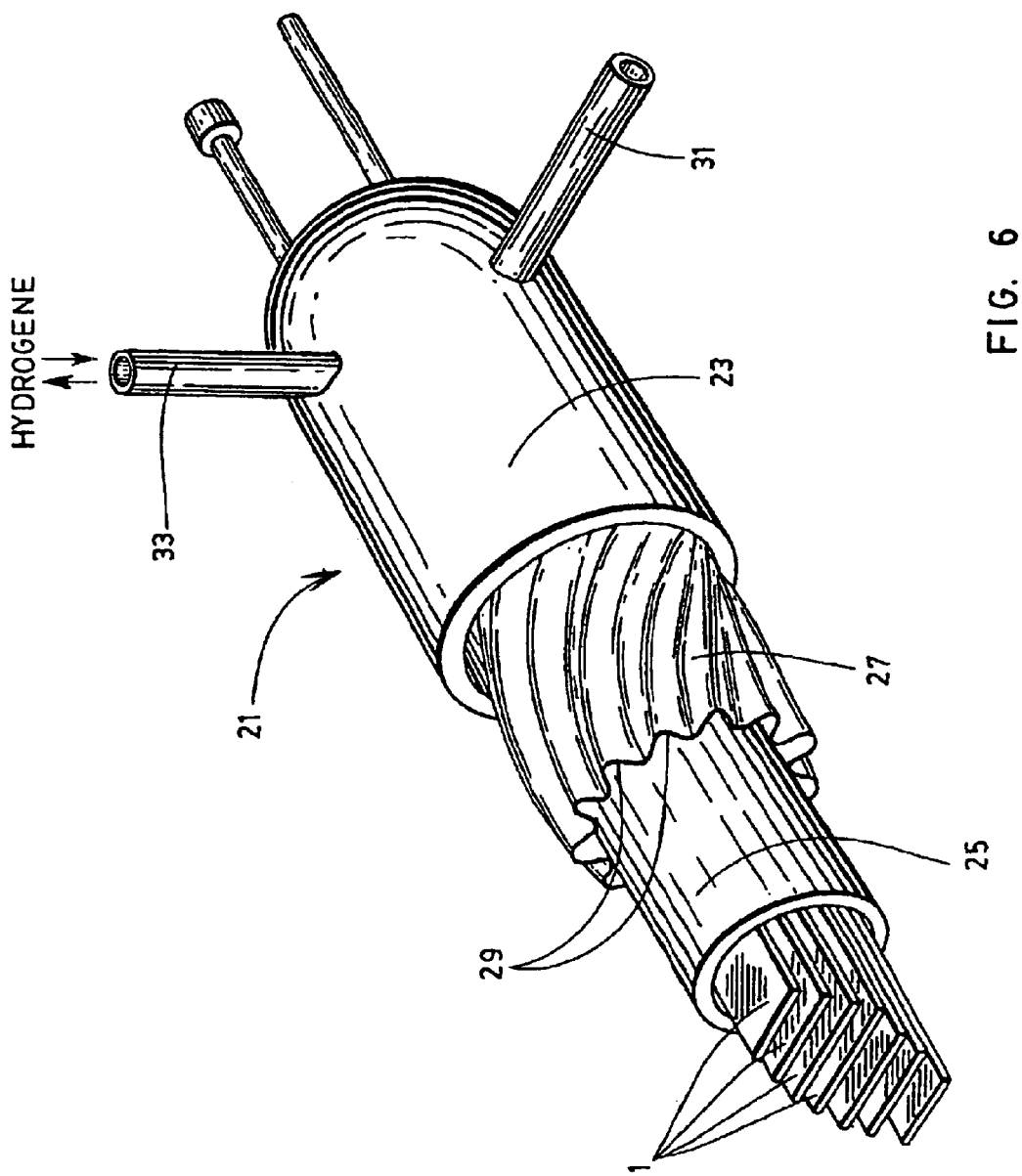
FIG. 6 is an open perspective view of the tank shown in cross-section in FIG. 5.
Figure 7A:
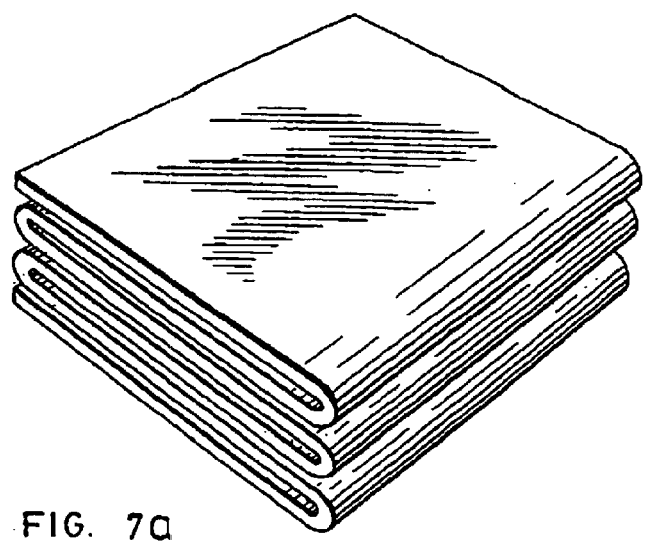
FIG. 7a to 7d are perspective views showing in a schematic manner, different shapes that may have the pieces according to the invention.
Figure 7B:
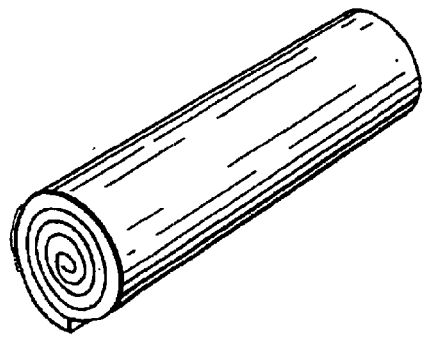
Figure 7C:
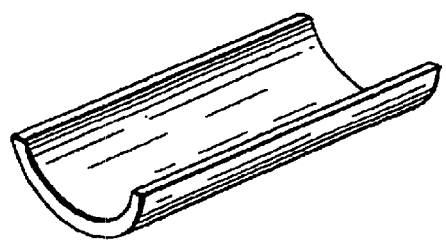
Figure 7D:
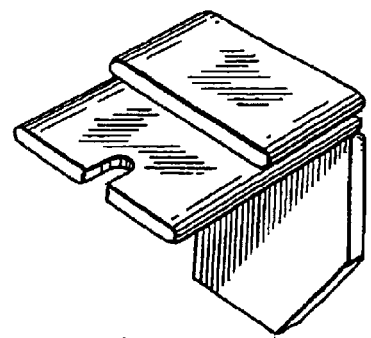

FIGS. 5 and 6 illustrate a possible use of several pieces 1 in the form of straight strips into a tank 21 for the storage and transportation of hydrogen. The tank 21 comprises an external wall 23, an internal wall 25 fixed to the external wall via a corrugated sleeve 27 acting as a mechanical reinforcement and a thermal breaking. Thanks to its structure, the sleeve also defines a plurality of conducts 29 for a heat carrying fluid (water, oil or any other liquid) which is brought at 31 and used for cooling during the absorption or for heating during the desorption of hydrogen. The hydrogen circulates via a pipe 33 opening into the container which is defined by the internal wall 25 and in which the pieces 1 are stacked. Contact plates 5 perforated with holes, act as heat carriers and are connected to the internal wall to act together with it as a heat exchanger. Mattresses of glass microfibers having a porosity of, for example, 90% with pores of, for example, 0,3 microns, are positioned between the pieces as shown in FIG. 2, to ensure the supply and removal of hydrogen and to absorb volume dilatation or contraction.

The tank 21 disclosed hereinabove, has numerous advantages. It is safe and of easy operation. It is easy to fill and of a great capacity. It allows liberation of hydrogen upon request, and such in a very efficient and fast manner thanks to the structure of the pieces 1 and their spacing. The absorption/desorption kinetics are very fast and the storage capacity is very high. The number of cycles of absorption/desorption is also high.

Such makes the tank 21 useful in the field of transportation (cars, buses, tractors, trucks, recreation vehicles, planes, boats, trains, military transports, etc . . . ) or for the manufacturers/users of fuel cells, the producers of decentralized energy, the users of hydrogen of very high purity and the users of filters for hydrogen.

So far, in all the applications involving hydrogen especially as a source of energy for fuel cells or internal combustion engines or as sources for the production of hydrogen in reformers or electrocatalic machines, the storage of hydrogen was done either under very high pressure with the safety problem that such generates (pressure >>300 psi), or in liquid form, with the problems of the storage at very low temperatures (<−253° C.). Another solution is the use of conventional hydrides in the form of a non compacted powder or of massive pieces with the problems that such generate, in particular, a very low absorption/desorption kinetics and a low storage capacity.

The use of rolling as proposed according to the invention for the manufacture of thin and dense strips of hydrides, permits to optimize the absorption/desorption kinetics in storage tanks and to maximize the heat transfer. The use of the intrinsic electric properties of the consolidated strips close to the percolation point, permits to measure the content of hydrogen and promote the desorption of hydrogen. Because of their structure, the so-obtained pieces permit to optimize mass and heat transfer within the tanks of metal hydrides. It provides large hydrogen absorption/desorption kinetics, fast mass and heat transfer and high number of cycles of absorption/desorption. Also because of their structure, the consolidated pieces are safe as compared to a powder of non-binded hydride which presents a certain level of pyrophoricity.

The technology disclosed hereinabove and the pieces of hydride(s) in the form of strips according to the invention may also be used efficiently for applications in batteries of the Ni-MH type (nickel-metal hydride).

The field of application of the hydride strips and the hydrogen storage tanks using these pieces in the form of rolled hydride strips according to the invention is therefore very wide. This technology is particularly well adapted for use with nanocristalline hydrides since these materials have very high hydrogen absorption and desorption kinetics. It is particularly well adapted for the Mg-containing hydrides (Mg, $Mg_2Ni$ and the related materials), Li, Na, Ti, Zr and Ca, which are known to be "stable" hydrides operating at a high temperature and for which the problem of heat exchange is important. This technology may also be used with low temperature hydrides such as $MmNi_5$, $LaNi_5$, $CaNi_5$, FeTi, $Ti_{0.98}$, $Zr_{0.02}$, $V_{0.43}$, $Fe_{0.09}$, $Cr_{0.05}$, Bogdanovic alloys, etc., that is, in summary, with all hydrides of the $AB_5$, $AB_2$, AB, $A_2B$, types, solid solutions, nanocrystalline and amorphous alloys, complex hydrides and even carbon, nanotubes, etc.

What is claimed is:

1. A piece comprising at least one metal hydride capable of absorbing hydrogen in a reversible manner, said piece being in the form of a thin and dense strip obtained by rolling a powder of said at least one metal hydride, wherein said powder of said at least one metal hydride is nanocrystalline said strip being obtained at a temperature lower than 400° C.

2. The piece according to claim 1 further comprising a first additional component for heat-related actions selected from the group consisting of supplying heat and evacuating heat.

3. The piece according to claim 2, wherein said first additional component is a binder for the powder of said at least one metal hydride.

4. The piece according to claim 1 further comprising a second additional component which is a binder for the powder of said at least one metal hydride.

5. The piece according to claim 4, wherein at least one of said first and said second additional components is in the form of a powder additive.

6. The piece according to claim 5, wherein said powder additive comprises Mg.

7. The piece according to claim 4, wherein at least one of said first and said second additional components is in the form of a tridimensional matrix that is rolled together with the powder of said at least one metal hydride.

8. The piece according to claim 7, said matrix comprises metal having a porous structure.

9. The piece according to claim 4, wherein at least one of said first and said second additional components is in the form of a plate in direct contact with the powder of said at least one metal hydride.

10. The piece according to claim 4, wherein at least one of said first and said second additional components is in the form of a plate in direct contact with a tube selected from the group consisting of a tube containing said at least one metal hydride and a rolled tube containing said powder of said at least one metal hydride.

11. The piece according to claim 4, wherein at least one of said first and said second additional components are up to 50% of the weight of the whole piece.

12. The piece according to claim 11, wherein at least one of said first and said second additional components are up to 30% of the weight of the whole piece.

13. The piece according to claim 1, said strip having a thickness equal to or less than 1 mm.

14. The piece according to claim 1 wherein said at least one nanocrystalline metal hydride comprises $MgH_2$-5 at. % V.

15. The piece according to claim 1 wherein said strip is of a shape selected from the group consisting of straight, stacked, folded, spiral, curved, twisted and cut shapes.

16. The piece according to claim 1, said piece being formed to have intrinsic electric characteristics allowing measurement of its hydrogen content.

17. The piece according to claim 1, said piece being formed to have intrinsic electric characteristics allowing desorption of hydrogen by circulation of an electrical current.

18. A method for storing and transporting hydrogen in a tank, comprising use of a piece according to claim 1.

19. A method for stocking and transporting energy in a battery of the Ni-MH type, comprising use of a piece according to claim 1.

* * * * *